US008593807B2

(12) United States Patent
Murakata

(10) Patent No.: US 8,593,807 B2
(45) Date of Patent: Nov. 26, 2013

(54) ELECTRONIC EQUIPMENT HAVING OPEN/CLOSE LOCK MECHANISM

(75) Inventor: Masato Murakata, Hyogo (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 13/110,447

(22) Filed: May 18, 2011

(65) Prior Publication Data
US 2011/0286181 A1    Nov. 24, 2011

(30) Foreign Application Priority Data

May 24, 2010    (JP) .................................. 2010-118589

(51) Int. Cl.
*G06F 1/16*    (2006.01)
(52) U.S. Cl.
USPC .............. 361/679.58; 361/679.27; 312/223.1; 312/223.2; 24/455
(58) Field of Classification Search
USPC .................................................... 361/679.58
See application file for complete search history.

(56) References Cited

U.S. PATENT DOCUMENTS

| 4,964,661 | A  | * | 10/1990 | Cadwell et al. ................. 292/87 |
| 5,927,997 | A  | * | 7/1999  | Ruland et al. ................... 439/31 |
| 6,175,491 | B1 |   | 1/2001  | Park |
| 6,484,374 | B2 | * | 11/2002 | McAllister ...................... 24/557 |
| 6,659,516 | B2 | * | 12/2003 | Wang et al. ................ 292/251.5 |
| 6,762,928 | B2 |   | 7/2004  | Lo |
| 6,880,373 | B2 |   | 4/2005  | Ling |
| 7,093,320 | B2 | * | 8/2006  | Tager ................................ 16/82 |
| 7,123,487 | B2 |   | 10/2006 | Saito et al. |
| 7,495,901 | B2 | * | 2/2009  | Yun et al. .................. 361/679.55 |
| 7,742,294 | B2 |   | 6/2010  | Gadau et al. |
| 7,751,187 | B2 |   | 7/2010  | Wang |
| 7,826,218 | B2 |   | 11/2010 | Wang |
| 7,876,567 | B2 |   | 1/2011  | Wang |
| 8,331,089 | B2 | * | 12/2012 | Tseng ....................... 361/679.55 |
| 2002/0015284 | A1 |   | 2/2002 | Howell et al. |
| 2005/0036284 | A1 | * | 2/2005 | Kang ............................. 361/683 |
| 2006/0268505 | A1 | * | 11/2006 | Krah ............................. 361/683 |
| 2011/0032667 | A1 |   | 2/2011 | Kobayashi |

FOREIGN PATENT DOCUMENTS

| JP | 7-36569      | 2/1995  |
| JP | 10-111733    | 4/1998  |
| JP | 2000-255612  | 9/2000  |
| JP | 2001-313479  | 11/2001 |
| JP | 2002-149271  | 5/2002  |
| JP | 2004-326440  | 11/2004 |
| JP | 2006-184998  | 7/2006  |
| JP | 2010-023932  | 2/2010  |
| JP | 2010-250513  | 11/2010 |
| JP | 2011-108170  | 6/2011  |

* cited by examiner

*Primary Examiner* — Anthony Q Edwards
(74) *Attorney, Agent, or Firm* — Hamre, Schumann, Mueller & Larson, P.C.

(57) ABSTRACT

The rotation direction of a lock member is substantially the same as the rotation direction of a second housing when the second housing is rotated from a closed position to an opened position. Thus, when the second housing is in a closed state, a user presses a base in a direction indicated by an arrow D with a finger of a hand, engages the finger with an inner surface of a concave, and displaces the hand in a direction indicated by an arrow B, thereby performing lock cancel of the lock member and a rotation operation of the second housing continuously.

12 Claims, 14 Drawing Sheets

ELECTRONIC EQUIPMENT HAVING OPEN/CLOSE LOCK MECHANISM

BACKGROUND

1. Field

The present application relates to electronic equipment having an open/close lock mechanism.

2. Description of Related Art

JP 2000-255612 A discloses a configuration of a notebook-computer that is opened/closed with a hinge shaft, in which an open/close lock portion having a knob that is placed on a display housing surface, a protrusion that passes through the display housing and extends to a body housing having a keyboard, and a protrusion end that is bent in parallel to an engagement portion provided in the body housing is biased to be engaged with the engagement portion by a biasing force of a spring provided in the display housing.

In the configuration disclosed by JP 2000-255612, a slide direction when the open/close lock portion is shifted from a locked state to a lock cancelled state is different from the rotation direction of the display housing. Therefore, in order to cancel the locked state of the open/close lock portion and rotate the display housing, a user should cancel the locked state by sliding the open/close lock portion with one hand and grasp and rotate the display housing with the other hand. Thus, the user generally needs to use both hands for opening the display housing, which cannot be considered to be satisfactory operability.

Further, in the configuration disclosed by JP 2000-255612 A, when a large impact is applied by a spring force biasing the open/close lock portion due to an impact caused by dropping, it is difficult to prevent the display housing and the body housing from being opened.

SUMMARY

Electronic equipment disclosed by the present application is provided with a first housing and a second housing rotatably supported relative to each other and is capable of being shifted between a first state in which a principal plane of the first housing and a principal plane of the second housing are opposed to each other and a second state in which the principal plane of the first housing and the principal plane of the second housing are retracted from each other. The electronic equipment includes a lock member that is placed rotatably at the second housing and is engaged with the first housing in the first state, and a rotation direction of the lock member when an engagement between the lock member and the first housing is cancelled is substantially the same as a rotation direction when the second housing is shifted from the first state to the second state.

DETAILED DESCRIPTION OF THE EMBODIMENTS (Embodiment)

[1. Configuration of electronic equipment]

Figure 1:
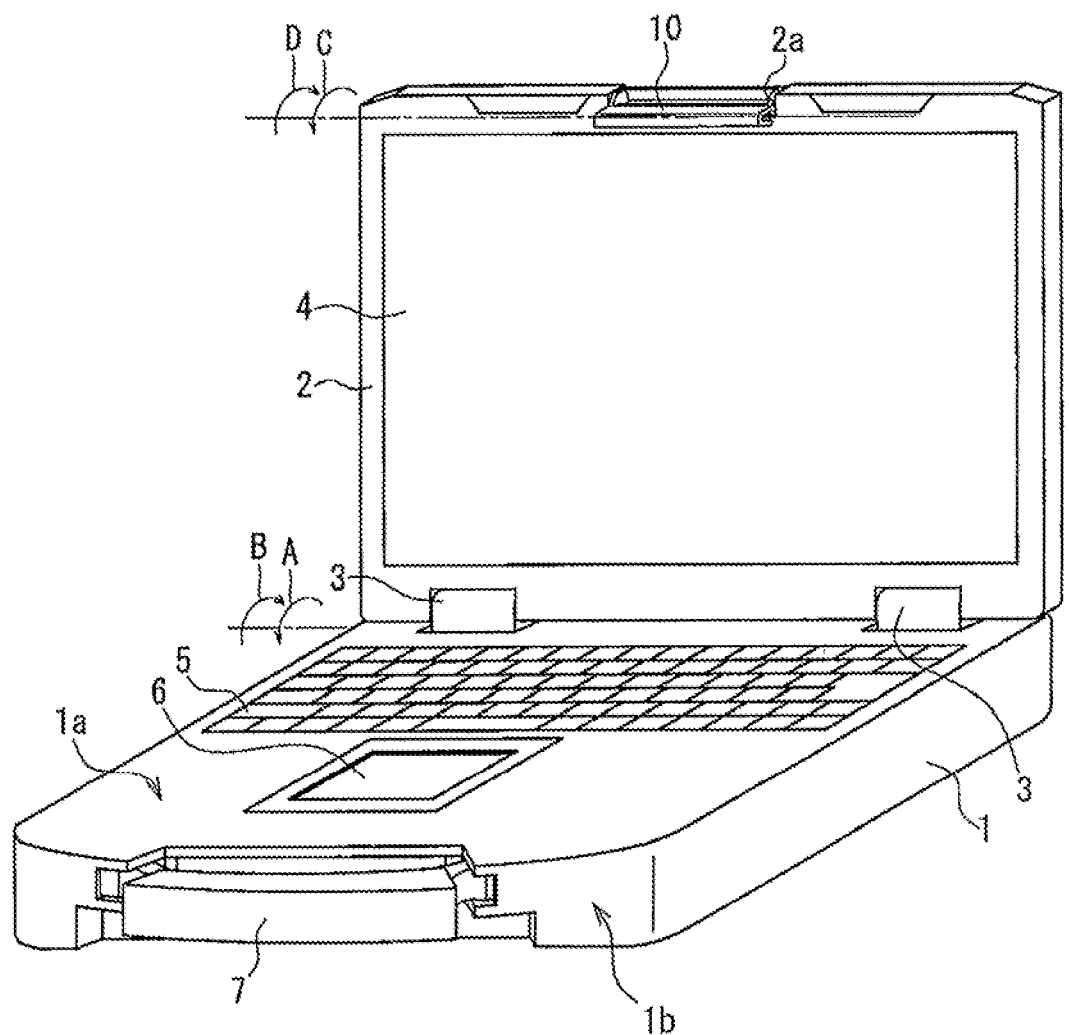
FIG. 1 is a perspective view of a notebook computer according to the present embodiment.
Figure 2:
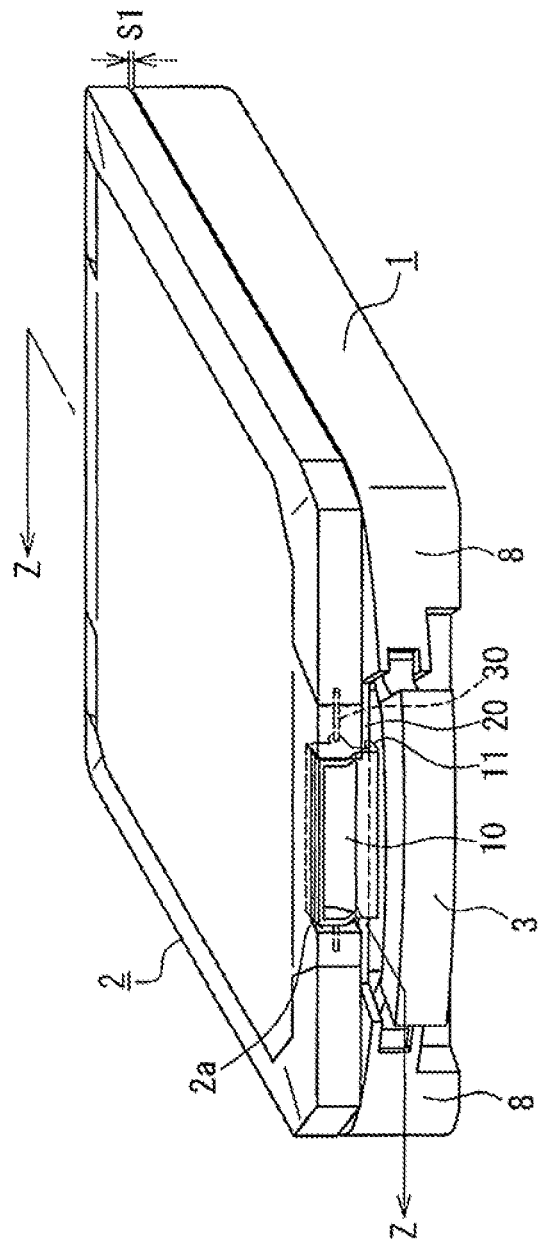
FIG. 2 is a perspective view of a notebook computer according to the present embodiment.

FIG. 1 is a perspective view illustrating an outer appearance of a notebook computer that is an example of electronic equipment according to the present embodiment. FIG. 1 illustrates a notebook computer in an opened state. FIG. 2 illustrates the notebook computer in a closed state. In the present embodiment, although a notebook computer is illustrated as an example of the electronic equipment, any equipment may be used as long as it has at least a plurality of housings, which are rotatably supported by a hinge mechanism.

As illustrated in FIG. 1, the notebook computer has a first housing and a second housing. The first housing 1 contains a circuit board on which various electric elements are mounted, a hard disk drive, and the like. The second housing 2 has a liquid crystal display 4. The first housing 1 and the second housing 2 are rotatably supported relative to each other by hinges 3, which enables the notebook computer to be shifted from the opened state to the closed state and vice versa. The hinges 3 support the first housing 1 and the second housing 2 rotatably in a direction indicated by an arrow A or B. On an upper surface 1a of the first housing 1, a keyboard 5 and a pointing device 6 are placed. On a front surface 1b of the first housing 1, a handle 7 is placed.

The "opened state" refers to the one in which a notebook computer takes a posture so that the upper surface 1a of the first housing 1 and the display surface of the liquid crystal display 4 are opened as illustrated in FIG. 1. The position of the first housing 1 or the second housing 2 when the notebook computer is in the opened state is referred to as an "opened position", i.e., the upper surface 1a and the display surface are retracted from each other. The "closed state" refers to the one in which the notebook computer takes a posture so that the upper surface 1a of the first housing 1 and a display surface of the liquid crystal display 4 are opposed to each other substantially in parallel, as illustrated in FIG. 2. The position of the first housing 1 or the second housing 2 when the notebook computer is in the closed state is referred to as a "closed position".

The second housing 2 has a concave 2a at an end opposed to the hinges 3 with the liquid crystal display 4 interposed therebetween. A lock member 10 is placed in the concave 2a. The lock member 10 is supported by the second housing 2 so as to rotate about a spindle 30. The lock member 10 can rotate in a direction indicated by an arrow C or D. The lock member 10 is biased in the direction indicated by the arrow C with a coil spring (not shown). The lock member 10 has a hook 11 at an end. The hook 11 can be engaged with an engagement portion 20 of the first housing 1 when the notebook computer is in the closed state as illustrated in FIG. 2. The second housing 2 is positioned at the closed position when the hook 11 is engaged with the engagement portion 20.

When the notebook computer is in the closed state as illustrated in FIG. 2, slight gap S1 is formed between the first housing 1 and the second housing 2. The gap S1 is formed since the second housing 2 is biased in the direction indicated by the arrow B due to the elasticity of an elastic body (not shown) provided on a surface of the second housing 2 opposed to the first housing 1. Alternatively, the gap S1 is formed due to a margin provided to the hinges 3 so as to prevent the surface of the liquid crystal display 4 from coming into contact with the keyboard 5 and the pointing device 6 when the notebook computer is in the closed state. The formation of the gap S1 can protect the surface of the liquid crystal display 4 from damage, etc. The formation of the gap S1 also can prevent the keyboard 5 and the pointing device 6 from being pressed at all times, which can prevent a user from performing an unintentional input operation. The first housing 1 can rotate by a movement amount corresponding to the gap S from the closed position illustrated in FIG. 2 in the direction indicated by the arrow B.

Figure 3:
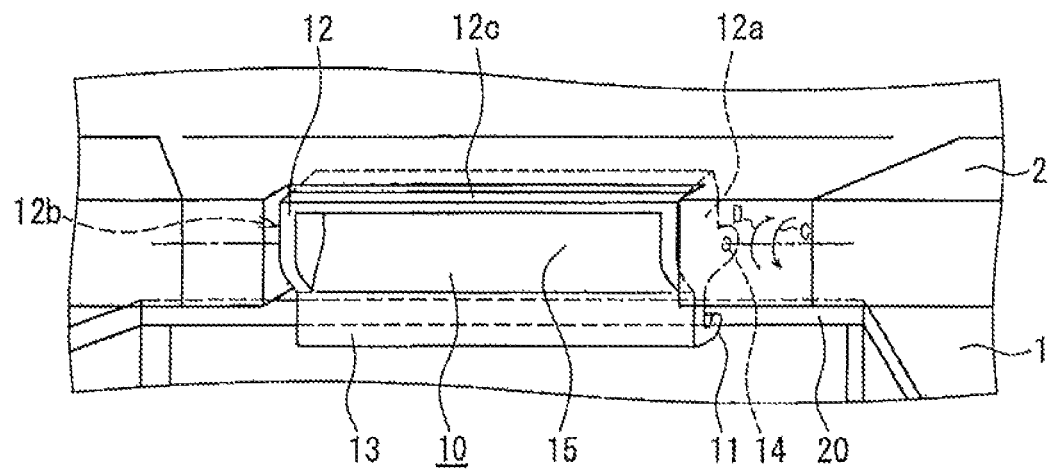
FIG. 3 is a perspective view of a vicinity of a lock member.
Figure 4:
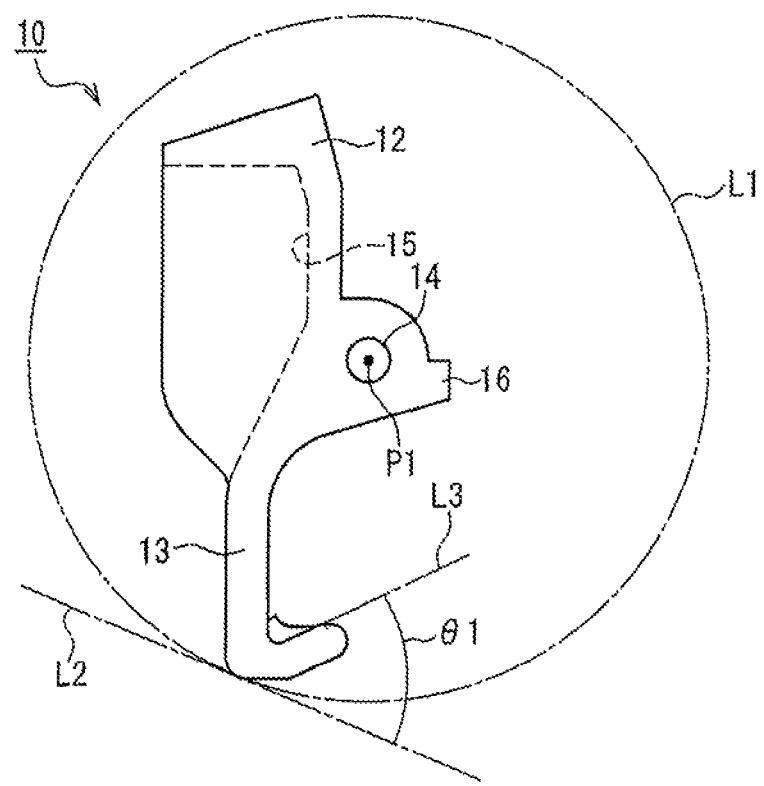
FIG. 4 is a side view of the lock member.

FIG. 3 is a perspective view of the lock member 10. FIG. 4 is a side view of the lock member 10. Although the lock member 10 is formed of magnesium as an example in the present embodiment, the material for the lock member 10 is not limited to magnesium. The lock member 10 includes a base 12 and an extension portion 13. The base 12 has a pair of side surfaces 12a and 12b opposed to each other, each having a hole 14 (only the hole 14 formed on the side surface 12a is illustrated) through which the spindle 30 is inserted. In the base 12, a concave 15 is formed on a front surface 12c adjacent to the side surfaces 12a and 12b. The concave 15 has an opening area and a depth in which at least a part of a user's finger (for example, a thumb of a right hand) can be inserted. The hook 11 is formed at an end of the extension portion 13.

In the present embodiment, although the spindle 30 is a member separate from the lock member 10, the spindle 30 may be molded integrally with the side surfaces 12a and 12b of the lock member 10. In this case, the holes 14 are not required.

In FIG. 4, alternate long and short dashed lines L1 indicate a movement path of the hook 11 when the lock member 10 rotates about the holes 14 (spindle 30). That is, the long and short dashed lines L1 indicate a perfect circle with a center point P1 of the holes 14 being the center. The lock member 10 attached to the first housing 1 is regulated so as to rotate only through a predetermined rotation angle. Therefore, the hook 11 will not actually follow the movement path as illustrated in FIG. 4 and will follow the movement path overlapping a partial line segment of the long and short dashed lines L1.

Long and short dashed lines L2 indicate a tangent at an intersection between the extension portion 13 of the lock member 10 and the movement path (the long and short dashed lines L1) of the hook 11. Long and short dashed lines L3 indicate a line extending from an inner surface 11a of the hook 11 in a plane direction.

An angle θ1 formed by the long and short dashed lines L2 and the long and short dashed lines L3 is preferably 5° or more, and in the present embodiment, 30° is set as an example of the angle θ1 at which the hook 11 can be engaged with the engagement portion 20 precisely and the engagement state is not cancelled easily. In the case where the angle θ1 is 0°, that is, the inner surface 11a of the hook 11 overlap or is parallel to the long and short dashed lines L2, the engagement state between the hook 11 an the engagement portion 20 becomes insufficient, resulting in the high possibility that the engagement state between the hook 11 and the engagement portion 20 is cancelled easily due to an impact to be applied, for example, when the notebook computer is dropped on the floor or the like. On the other hand, when the angle θ1 is set to be too high (for example, 50° or more), although the engagement between the hook 11 and the engagement portion 20 can be ensured, the user cannot easily cancel the engagement state between the hook 11 and the engagement portion 20 intentionally by rotating the lock member 10, since the rotation distance of the extension portion 13 needs to be set long along the long and short dashed lines L1. Even with this configuration, for example, if the length of an inner surface 11a (described later) of the hook 11 to be engaged with the engagement portion 20 is set to be small, the rotation distance also can be small correspondingly. However, in this configuration, the engagement state between the lock member 10 and the engagement portion 20 tends to become weak. Accordingly, it is preferred to set the angle θ1 in a range of 5° to 45°.

[2. Lock operation and lock cancel operation of a lock member]

Figure 5A:
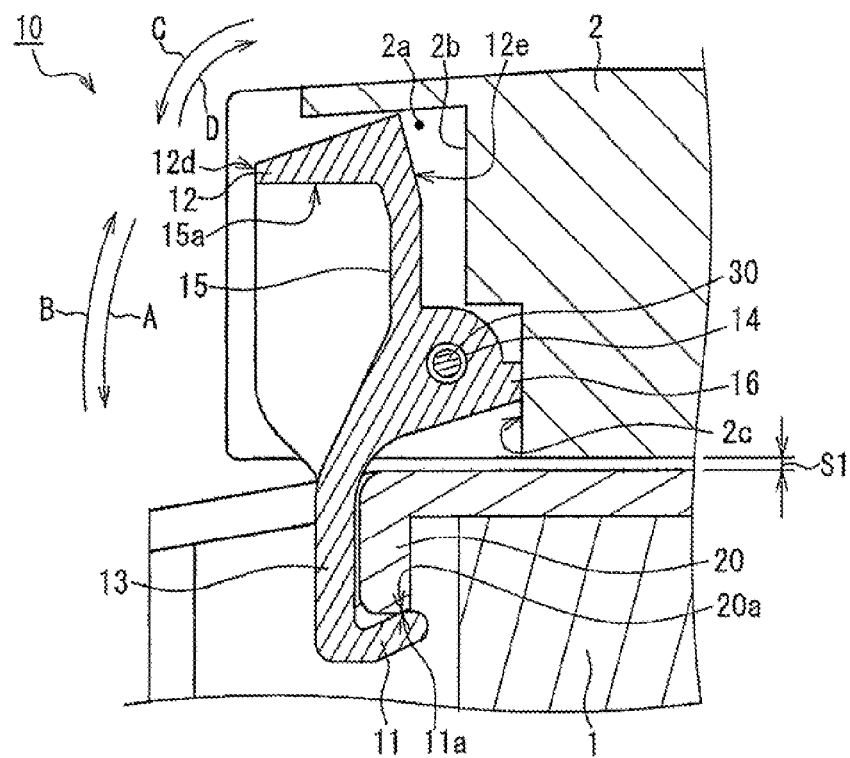
FIG. 5A is a cross-sectional view illustrating the rotation transition of the lock member and a second housing.
Figure 5B:
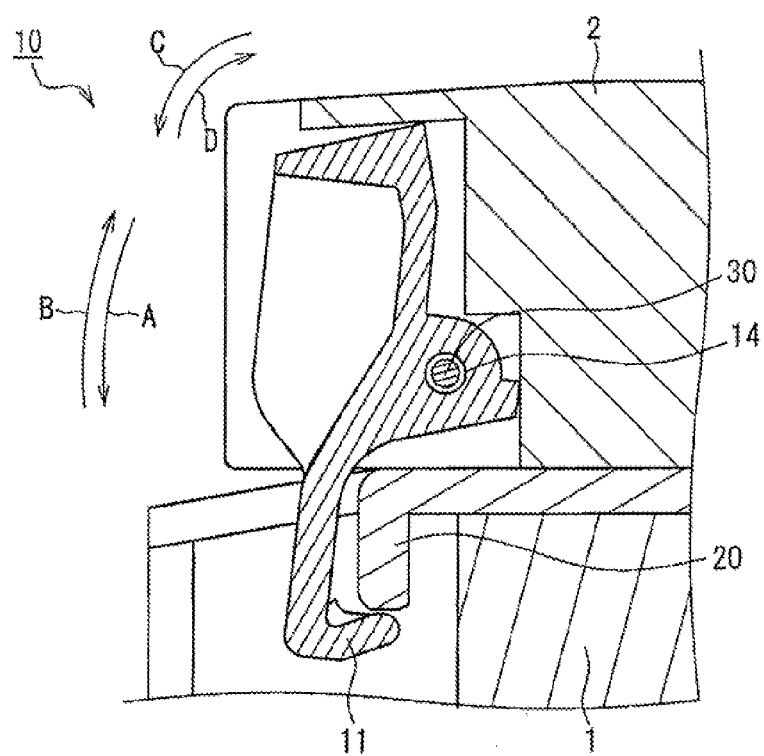
FIG. 5B is a cross-sectional view illustrating the rotation transition of the lock mechanism and the second housing.
Figure 5C:
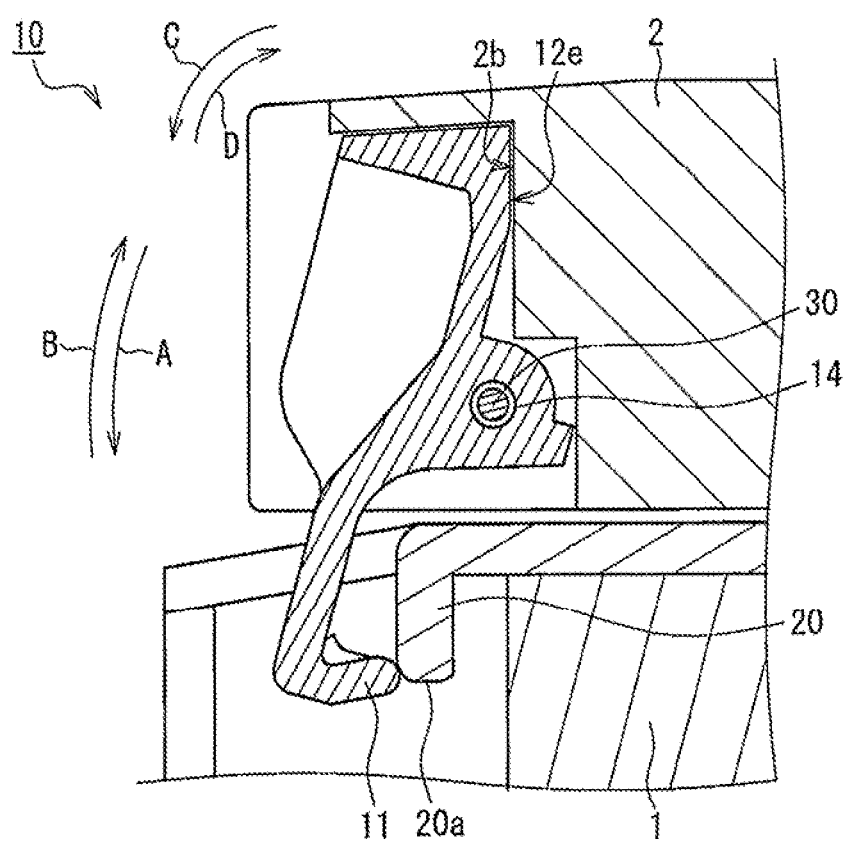
FIG. 5C is a cross-sectional view illustrating the rotation transition of the lock mechanism and the second housing.
Figure 5D:
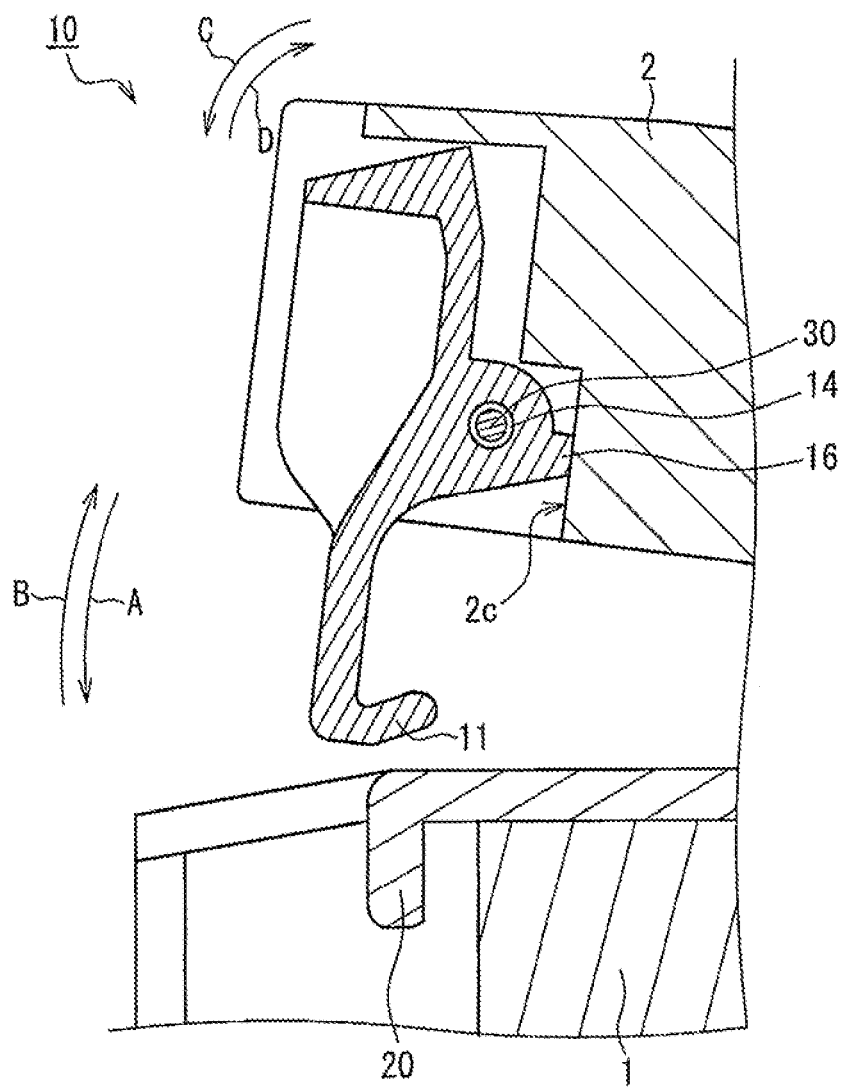
FIG. 5D is a cross-sectional view illustrating the rotation transition of the lock mechanism and the second housing.

FIGS. 5A to 5C are cross-sectional views illustrating the transition of an operation of the lock member. FIGS. 5A to 5C are cross-sectional views taken along a line Z-Z in FIG. 2. FIG. 5A illustrates a locked state. FIG. 5B illustrates a state in which the hook 11 tries to overpass the engagement portion 20. FIG. 5C illustrates a state in which the locked state formed by the lock member 10 is cancelled. FIG. 5D illustrates a state in which the second housing 2 rotates from the closed position in the direction indicated by the arrow B.

As illustrated in FIG. 5A, in the locked state in which the second housing 2 is positioned at the closed position with respect to the first housing 1, the lock member 10 is placed at a position the lock member 10 reaches after being pushed to rotate by a coil spring (not shown) in the direction indicated by the arrow C. The lock member 10 is regulated for the rotation in the direction indicated by the arrow C when a regulating portion 16 that is a part of the base 12 comes into contact with a side surface 2c in the concave 2a of the second housing 2. The hook 11 is engaged with the engagement portion 20. Further, the inner surface 11a of the hook 11 abuts on an end face 20a of the engagement portion 20 or is opposed thereto with a small gap interposed therebetween. The lock member 10 is regulated for the rotation in the direction indicated by the arrow C by bringing the inner surface 11a of the hook 11 into contact with the end face 20a of the engagement portion 20 or by enabling the slight displacement of the lock member 10 to bring the inner surface 11a of the hook 11 into contact with the end face 20a of the engagement portion 20.

In order to shift the notebook computer from the closed state illustrated in FIG. 5A to the opened state, the user first inserts a finger (for example, a thumb of a right hand) in the concave 15 of the lock member 10 and presses the base 12 in a direction indicated by an arrow D. Consequently, the lock member 10 tries to rotate about the spindle 30 in the direction indicated by the arrow D. The lock member 10 can be rotated until a back surface 12e of the base 12 comes into contact with a regulating surface 2b.

By rotating the lock member 10 until the base 12 comes into contact with the regulating surface 2b, the engagement between the hook 11 and the engagement portion 20 is cancelled. At this time, the inner surface 11a of the hook 11 and the end face 20a of the engagement portion 20 abut on each other on a plane parallel to the long and short dashed lines L3 illustrated in FIG. 4. Therefore, the hook 11 overpasses the engagement portion 20 to be retracted therefrom.

As illustrated in FIG. 5B, when the hook 11 overpasses the engagement portion 20, the lock member 10 tries to be displaced slightly in the direction indicated by the arrow A (see FIG. 5A) while rotating in the direction indicated by the arrow D. Since the lock member 10 is supported by the second housing 2, the second housing 2 rotates slightly in the direction indicated by the arrow A along with the displacement of the lock member 10 in the direction indicated by the arrow A. As illustrated in FIG. 5A, there is the gap S1 between the first housing 1 and the second housing 2 when the notebook computer is in the closed state. Therefore, the second housing 2 can rotate by a movement amount corresponding to the gap S1 in the direction indicated by the arrow A.

In order to rotate the second housing 2 from the closed position illustrated in FIG. 5A to the opened position, the user may press the second housing 2 intentionally in the direction indicated by the arrow A and then rotate the lock member 10 in the direction indicated by the arrow D. Even with such an operation, the engagement state between the hook portion 11 and the engagement portion 20 can be cancelled.

When the engagement state between the hook 11 and the engagement portion 20 is cancelled, a state as illustrated in FIG. 5C is obtained. By canceling the engagement state between the hook 11 and the engagement portion 20, a state is obtained in which the second housing 2 can be rotated in the direction indicated by the arrow B. The user can push up the lock member 10 in the direction indicated by the arrow B by bringing the finger inserted in the concave 15 into contact with, for example, the inner surface 15a (see FIG. 5A) of the concave 15. Consequently, the second housing 2 rotates in the direction indicated by the arrow B. When the second housing 2 is rotated to a position where the lock member 10 is retracted from the first housing 1, a state as illustrated in FIG. 5D is obtained.

As illustrated in FIG. 5D, when the user rotates the second housing 2 to a position where the lock member 10 is retracted from the first housing 1 and detaches the finger from the lock member 10, the lock member 10 is pressed with the coil spring (not shown) to rotate about the spindle 30 in the direction indicated by the arrow C. The lock member 10 is regulated for the rotation in the direction indicated by the arrow C when the regulating portion 16 comes into contact with the side surface 2c, and the state as illustrated in FIG. 5D is obtained. The lock member 10 illustrated in FIG. 5D is regulated for the rotation in the direction indicated by the arrow C with the regulating portion 16 abutting on the side surface 2C. The second housing 2 can be rotated up to the opened position as illustrated in FIG. 1 after the lock member 10 is placed in the state illustrated in FIG. 5D.

In order to shift the notebook computer from the opened state to the closed state, the second housing 2 is rotated from the opened position illustrated in FIG. 1 in the direction indicated by the arrow A. When the second housing 2 is rotated to a predetermined position in the direction indicated by the arrow A, the lock member 10 slides over the surface of the engagement portion 20 to reach the position illustrated in FIG. 5C. When the lock member 10 slides over the surface of the engagement portion 20, the lock member 10 rotates about the spindle 30 in the direction indicated by the arrow D against the biasing by the coil spring (not shown).

When the user presses the second housing 2 in the direction indicated by the arrow A, the lock member 10 is displaced in the direction indicated by the arrow A together with the second housing 2. When the second housing 2 and the lock member 10 are displaced to the position illustrated in FIG. 5B, the lock member 10 rotates in the direction indicated by the arrow C due to the pressure force by the coil spring (not shown). Specifically, the lock member 10 rotates to a position where the inner surface 11a of the hook 11 and the end face 20a of the engagement portion 20 are opposed to each other or come into contact with each other as illustrated in FIG. 5A.

When the lock member 10 rotates to the position illustrated in FIG. 5A, the second housing 2 is positioned at the closed position with respect to the first housing 1. Specifically, when the lock member 10 rotates to the position illustrated in FIG. 5A, the inner surface 11a of the hook 11 abuts on the end face 20a of the engagement portion 20, and the housing 2 cannot rotate in the direction indicated by the arrow B, even when an attempt is made to rotate the second housing 2 in the direction indicated by the arrow B.

[3. Effects of the embodiment, etc.]

According to the present embodiment, the rotation direction (direction indicated by the arrow D) of the lock member 10 and the rotation direction (direction indicated by the arrow B) of the second housing 2 when the second housing 2 is rotated from the closed position to the opened position are substantially the same. Thus, the user can perform the lock cancel of the lock member 10 and the rotation operation of the second housing 2 continuously by pressing the base 12 in the direction indicated by the arrow D with a finger of a hand (for example, a thumb of a right hand) when the second housing 2 is in the closed position, engaging the finger with the inner surface 15a of the concave 15, and displacing the hand in the direction indicated by the arrow B. That is, the user can perform the lock cancel of the lock member 10 and the rotation operation of the second housing 2 by one press operation, and hence, the user can shift the notebook computer easily from the closed state to the opened state with one hand.

The hinges 3 controlling the rotation of the second housing 2 with respect to the first housing 1 generally include a predetermined torque for rotation so as to suppress the ease of shifting from the closed position to the opened position. As is well known, since the static friction force of the torque is larger than the dynamic friction force thereof, if only the second housing 2 is grasped to be opened when the closed position is shifted to the opened position, the first housing 1 also moves in synchronization with the second housing 2, which results, in the notebook computer being lifted up. On the other hand, due to the configuration in which the lock cancel of the lock member 10 and the rotation operation of the second housing 2 are performed with one press operation as described above, the second housing 2 is opened with respect to the first housing 1 by the lock cancel operation, which allows the torque of the hinges 3 to exhibit dynamic friction force, making it easier to open only the second housing 2. Specifically, when the lock member 10 is rotated from the state where the notebook computer is closed in the direction indicated by the arrow D, the hook 11 runs on to the engagement portion 20, and the second housing 2 is rotated in the direction indicated by the arrow A as illustrated in FIG. 5B.

When the state illustrated in FIG. 5A is shifted to the state illustrated in FIG. 5B, the elastic body (not shown) placed on the surface of the second housing 2 opposed to the first housing 1 in the closed state is deformed by compression since the gap S1 between the first housing 1 and the second housing 2 becomes small, or the first housing 1 and the second housing 2 approach each other due to the margin in the hinges 3. Next, as illustrated in FIG. 5C, when the engagement between the hook 11 and the engagement portion 20 is cancelled, the second housing 2 is displaced in the direction indicated by the arrow B due to the elastic restoring force of the elastic body (not shown) or the margin of the hinges 3. By rotating the second housing 2 in the direction indicated by the arrow B along with the displacement operation, dynamic friction force is generated in the torque mechanism in the hinges 3 at a time of the beginning of the rotation of the second housing 2. Thus, when the second housing 2 is shifted from the closed state to the opened state, the possibility that the first housing 1 follows the rotation operation of the second housing 2 decreases, which makes it easier to open only the second housing 2.

Further, according to the present embodiment, by setting the angle θ1 formed by the tangent L2 at an intersection between the extension portion 13 of the lock member 10 and the movement path (alternate long and short dashed lines L1) of the hook 11 and the line L3 extending from the inner surface 11a of the hook 11 in the plane direction to be 5° or more, even when the notebook computer is dropped to a floor or the like in the locked state illustrated in FIG. 5A, the possibility that the locked state of the lock member 10 is cancelled by an impact caused by dropping can be decreased. Thus, the notebook computer can be prevented from being opened easily at a time of dropping.

The first housing 1 in the present embodiment is an example of the first housing. The second housing 2 in the present embodiment is an example of the second housing. The lock member 10 in the present embodiment is an example of the lock member. The hook 11 in the present embodiment is an example of the hook. The closed state in the present embodiment is an example of the first state. The opened state in the present embodiment is an example of the second state. A protective member 40 in the present embodiment is an example of the protective member. A rib 50 in the present embodiment is an example of the rib.

Further, in the present embodiment, the case has been described in which a finger is inserted in the concave 15 of the lock member 10 when the second housing 2 is shifted from the locked state of FIG. 5A to the state where the hook 11 of FIG. 5B tries to overpass the engagement portion 20, with respect to the first housing 1. However, for example, the end face 12d of the base 12 of the lock member 10 may be pressed as illustrated in FIG. 5A.

Further, in the configuration of the lock member 10 having the concave 15 described in the present embodiment, since the position where the locked state between the first housing 1 and the second housing 2 is cancelled can be understood easily, the user can be prevented from being perplexed at a time of canceling the lock.

Figure 6:
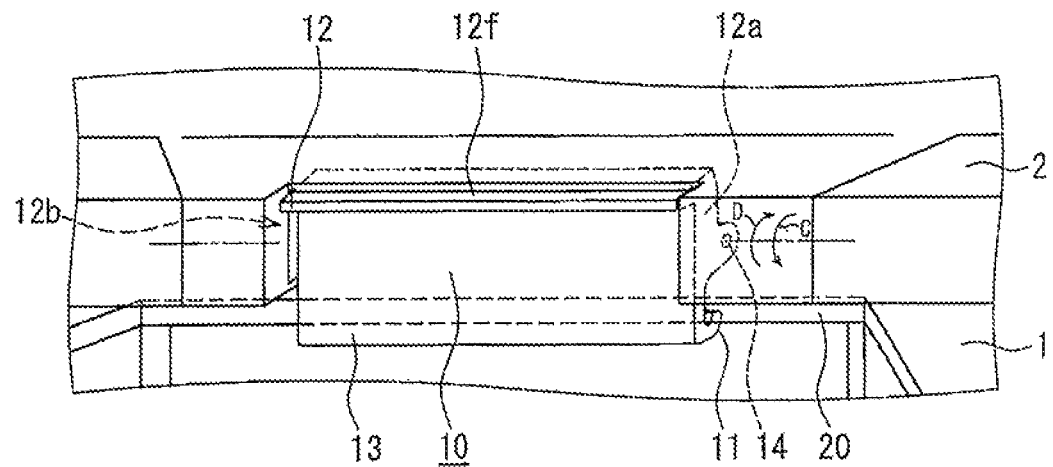
FIG. 6 is a perspective view of main portions illustrating a modified example of the lock member.
Figure 7:
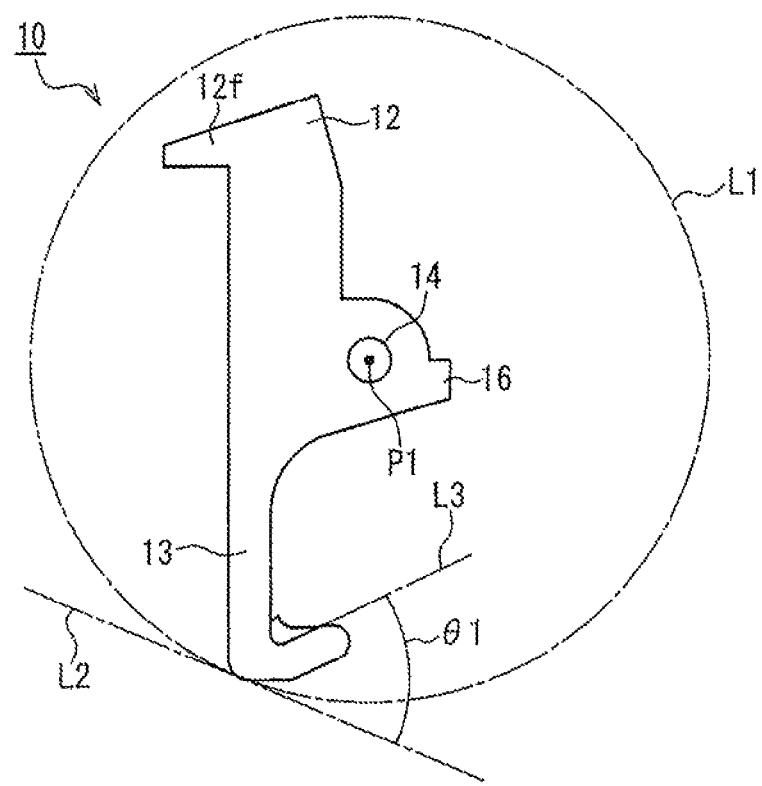
FIG. 7 is a side view illustrating the modified example of the lock member.

As the shape of the lock member 10, the configuration having the concave 15 so as to achieve the reduction in weight has been described. The configuration having a protrusion 12f at the base 12 of the lock member 10 without having the concave 15 as illustrated in FIG. 6 (partially perspective view of the vicinity of the lock member 10) and FIG. 7 (side view of the lock member 10) may be used.

Although the protrusion 12f may protrude from the side surface (surface directed in the same direction as that of the front surface 1b of the first housing 1 when the notebook computer is in the closed state) of the second housing 2, it is preferred that the protrusion 12f is flush with the side surface of the second housing 2 or housed in the concave 2a so as not to protrude from the side surface of the second housing 2.

Further, the presence of a plurality of minute projections and depressions in the vicinity of the protrusion 12f of the lock member 10 can make it difficult for the finger of the user to slide when the finger comes into contact with the vicinity of the protrusion 12f.

Figure 8:
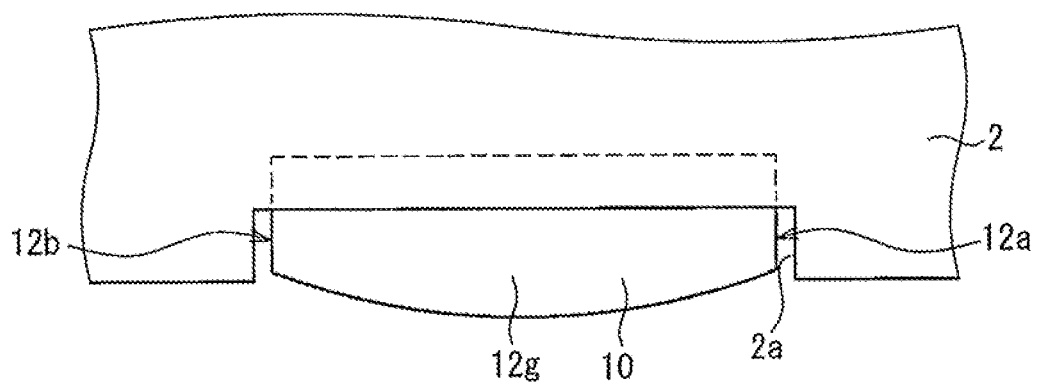
FIG. 8 is a plan view of main portions illustrating the modified example of the lock member.

Further, as illustrated in FIG. 8 (plan view of the vicinity of the lock member 10), a protrusion 12g provided at the base 12 of the lock member 10 may protrude from the side surfaces 12a and 12b to the center thereof. That is, the shape of the lock member 10 is not limited as long as the lock by the lock member 10 can be cancelled by the finger of the user. The protrusion 12g may protrude from the side surface (surface directed in the same direction as that of the front surface 1b of the first housing 1 when the notebook computer is in the closed state) of the second housing 2 (see FIG. 8), may be flush with the side surface of the second housing 2, or may be contained in the concave 2a so as not to protrude from the side surface of the second housing 2. As illustrated in FIG. 8, in the case of allowing the protrusion 12g to protrude from the side surface of the second housing 2, it is preferred that the side surfaces 12a and 12b of the base 12 are designed so as not to protrude from the side surface of the second housing 2.

Hereinafter, modified examples of the electronic equipment according to the present embodiment will be described.

MODIFIED EXAMPLE 1

Figure 9:
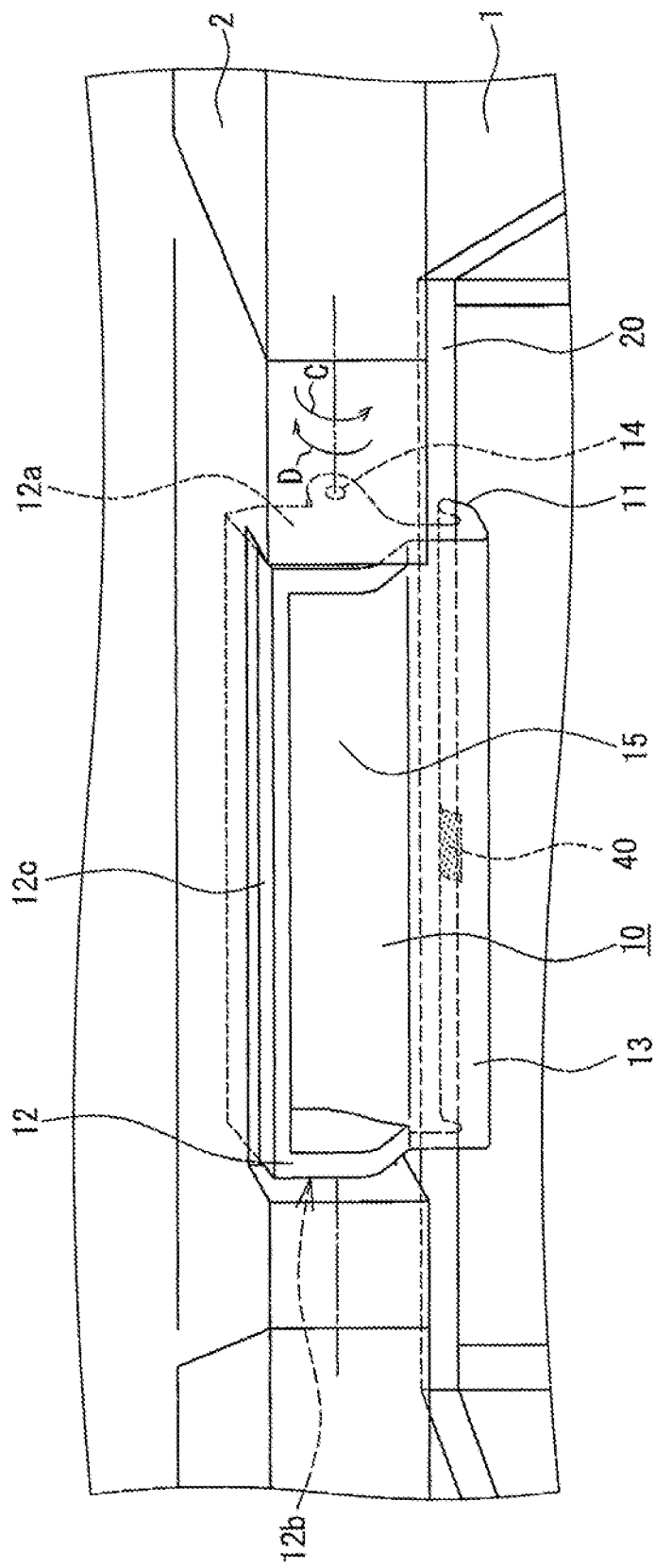
FIG. 9 is a perspective view of Modified Example 1 of a notebook computer according to the present embodiment.

FIG. 9 is a perspective view of main portions of the lock member 10 provided with the protective member 40. FIGS. 10A to 10D are cross-sectional views of main portions illustrating open/close transition of a notebook computer provided with, the lock member 10 illustrated in FIG. 9.

Figure 10A:
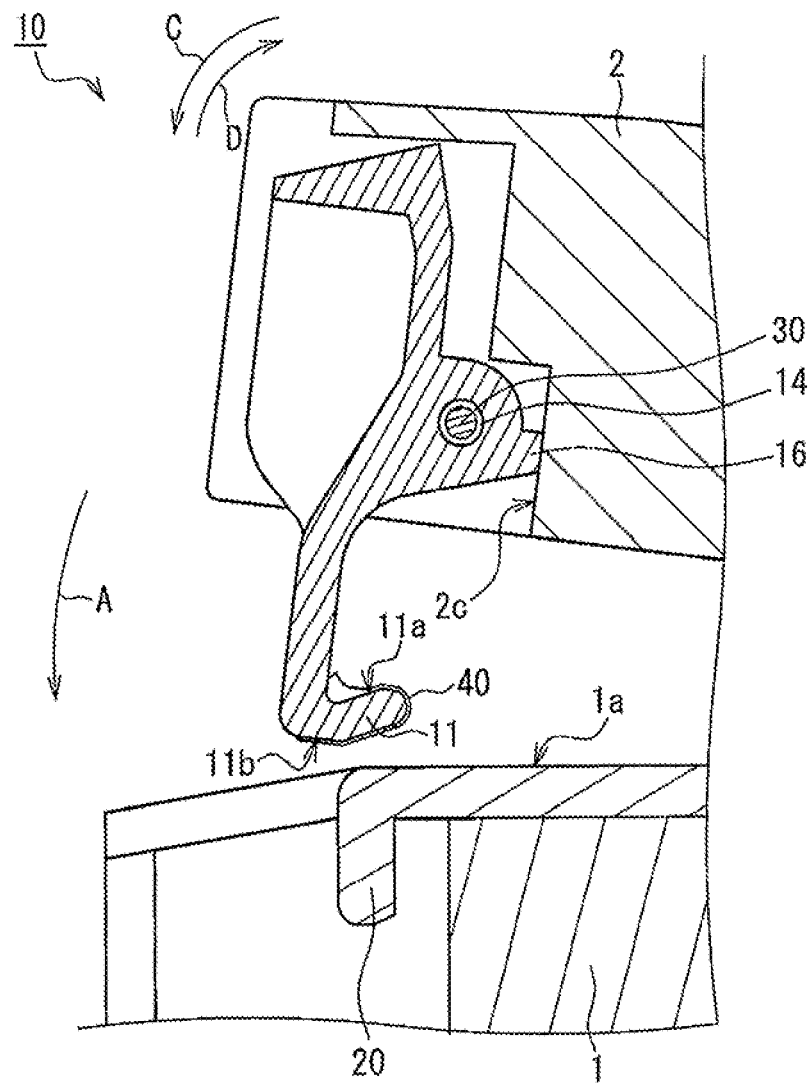
FIG. 10A is a cross-sectional view illustrating the rotation transition of a lock member and a second housing according to Modified Example 1.

It is preferred that the protective member 40 illustrated in FIG. 9 is made of a material, such as resin, softer than that (magnesium in the present embodiment) for the upper surface 1a of the first housing 1 and the engagement portion 20. The protective member 40 is formed at the center of the lock member 10 in the longitudinal direction thereof as illustrated in FIG. 9 continuously from the inner surface 11a of the hook 11 to a lower surface 11b thereof as illustrated in FIG. 10A. Although the protective member 40 is placed at the center in the longitudinal direction of the lock member 10 as illustrated in FIG. 9 in the present embodiment, the position of the protective member in the longitudinal direction of the lock member 10 is not limited as long as the protective member 40 is formed from the inner surface 11a of the hook 11 to the lower surface 11b as illustrated in FIG. 10A. Hereinafter, the closing operation of the notebook computer will be described.

Figure 10B:
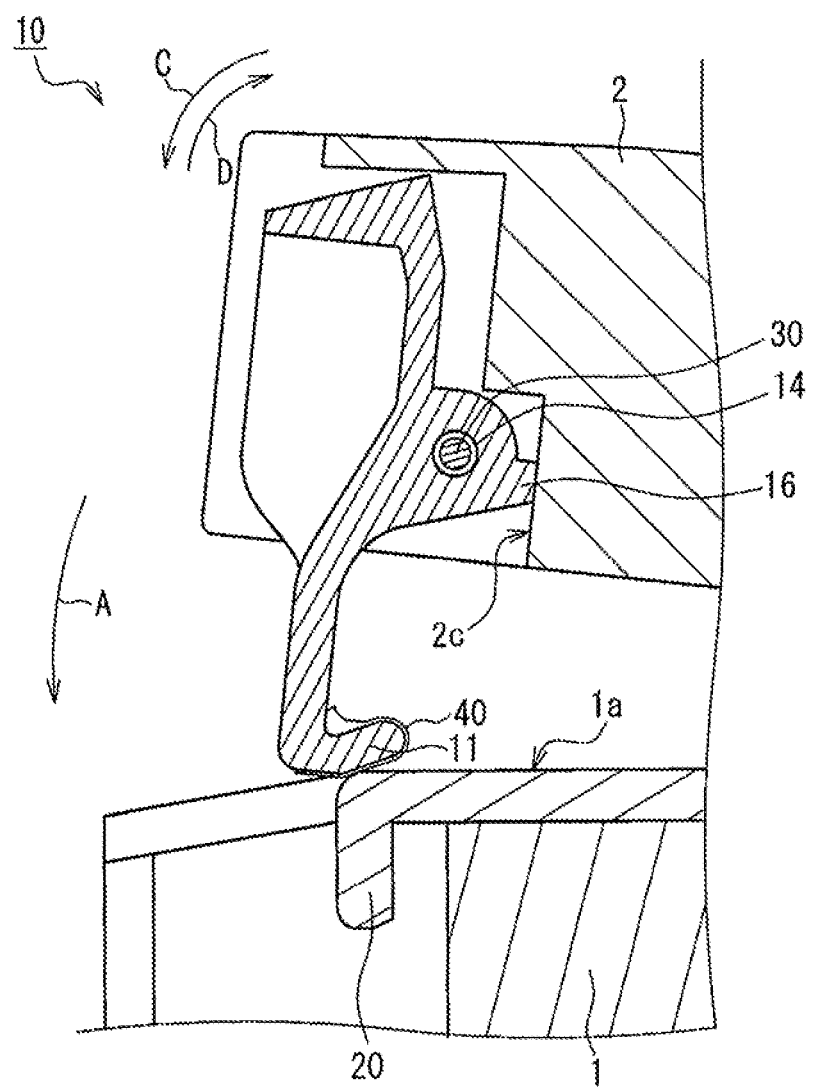
FIG. 10B is a cross-sectional view illustrating the rotation transition of the lock member and the second housing according to Modified Example 1.

First, as illustrated in FIG. 10A, when the second housing 2 is rotated in the direction indicated by the arrow A when the lock member 10 is retracted from the first housing 1, the protective member 40 comes into contact with the upper surface 1a of the first housing 1 as illustrated in FIG. 10B. At this time, the hook 11 floats slightly with a minute gap interposed between the hook 11 and the upper surface 1a of the first housing 1 without touching the upper surface 1a of the first housing 1.

Figure 10C:
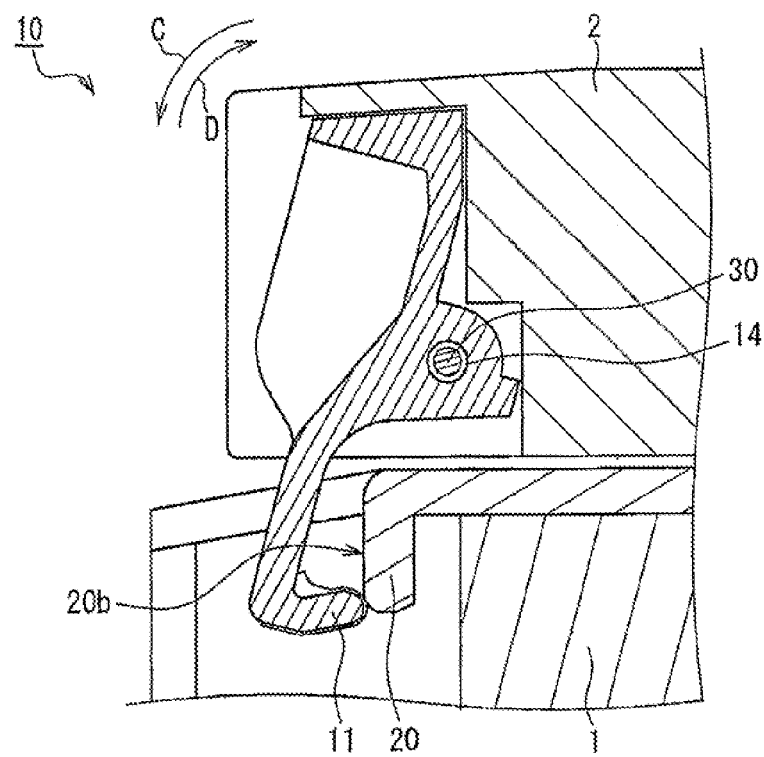
FIG. 10C is a cross-sectional view illustrating the rotation transition of the lock member and the second housing according to Modified Example 1.

When the second housing 2 is rotated further from the state illustrated in FIG. 10B in the direction indicated by the arrow A, the lock member 10 is displaced in the direction indicated by the arrow A while the protective member 40 slides over the side surface 20b of the engagement portion 20 as illustrated in FIG. 10C.

Figure 10D:
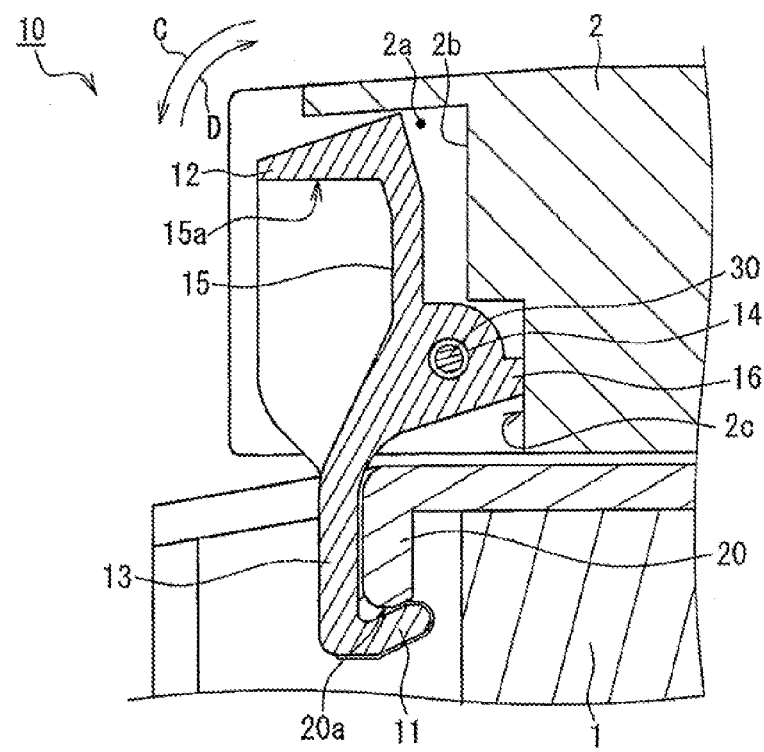
FIG. 10D is a cross-sectional view illustrating the rotation transition of the lock member and the second housing according to Modified Example 1.

When the second housing 2 is rotated further from the state illustrated in FIG. 10C in the direction indicated by the arrow A, the hook 11 overpasses the end face 20a of the engagement portion 20 and reaches the state illustrated in FIG. 10D. FIG. 10D illustrates a state in which the hook 11 is engaged with the engagement portion 20. In the present example, the protective member 40 slides over the upper surface 1a of the first housing 1 and the engagement portion 20 continuously until being engaged with the engagement portion 20 as illustrated in FIG. 10D, after coming into contact with the upper surface 1a of the first housing 1 as illustrated in FIG. 10B.

Thus, since the lock member 10 has the protective member 40 made of, for example, resin, the damage to the upper surface 1a of the first housing 1 and the engagement portion 20 can be reduced, when the second housing 2 is opened/closed, that is, when the lock member 10 slides over the upper surface 1a of the first housing 1 and the engagement portion 20.

In the lock member 10 not having the protective member 40, when the second housing 2 is opened/closed, that is, when the lock member 10 slides over the upper surface 1a of the first housing 1 and the engagement portion 20, the hook 11 slides over the upper surface 1a of the first housing 1 and the engagement portion 20. In the case where the hook 11 and the first housing 1 are made of metal, when the hook 11 slides over the upper surface is of the first housing 1 and the engagement portion 20, the hook 11 may damage the upper surface 1a of the first housing 1 and the engagement portion 20, or peel off the coating of the upper surface 1a of the first housing 1 and the engagement portion 20. If the lock member 10 has the protective member 40 as in the present example, the protective member 40 made of resin softer than the material for the upper surface 1a of the first housing 1 and the engagement portion 20 slides over the upper surface 1a of the first housing 1 and the engagement portion 20. Therefore, damage to the upper surface 1a of the first housing 1 and the engagement portion 20 and peeling of coating can be reduced.

MODIFIED EXAMPLE 2

Figure 11:
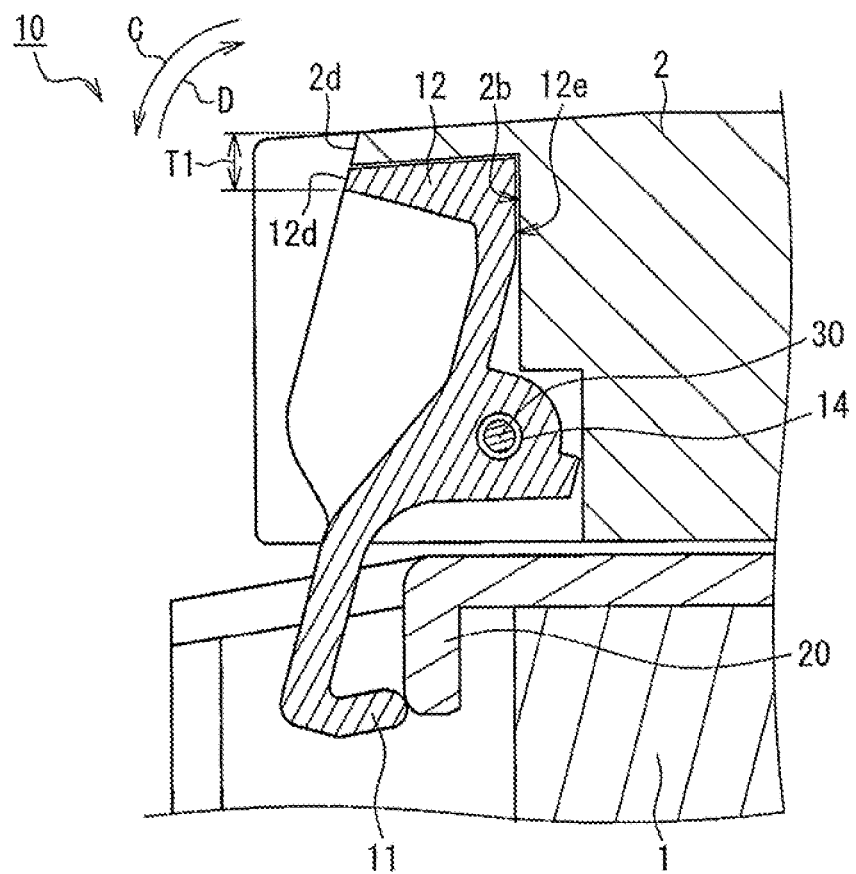
FIG. 11 is a cross-sectional view of Modified Example 2 of the notebook computer according to the present embodiment.

FIG. 11 is a cross-sectional view of main portions of a notebook computer having a lock member in which the end face 12d of the base 12 is flush with the end face 2d of the second housing 2.

In the configuration in which the end face of the base 12 does not become flush with the end face of the second housing 2 when the lock member 10 is rotated until the back surface 12e comes into contact with the regulating surface 2b as illustrated in FIG. 5C, when the user presses the end face 12d of the base 12 with the finger from the state illustrated in FIG. 5A and presses the lock member 10 up to the position illustrated in FIG. 5C to rotate the second housing 2 in the direction indicated by the arrow B, the pressure is concentrated on the finger of the user.

By designing the end face 12d of the base 12 and the end face 2d of the second housing 2 so that they become flush with each other when the lock member 10 is rotated until the back surface 12e comes into contact with the regulating surface 2b as illustrated in FIG. 11, a width T1 of a plane formed by the end face 12d of the base 12 and the end face 2d of the second housing 2 can be set to be larger than that, for example, in the configuration illustrated in FIG. 5C. Thus, the area on which the finger of the user abuts can be enlarged while the second housing 2 is opened/closed, and hence, the pressure is prevented from being concentrated on the finger of the user. This can alleviate pain for the user through the finger.

MODIFIED EXAMPLE 3

Figure 12A:
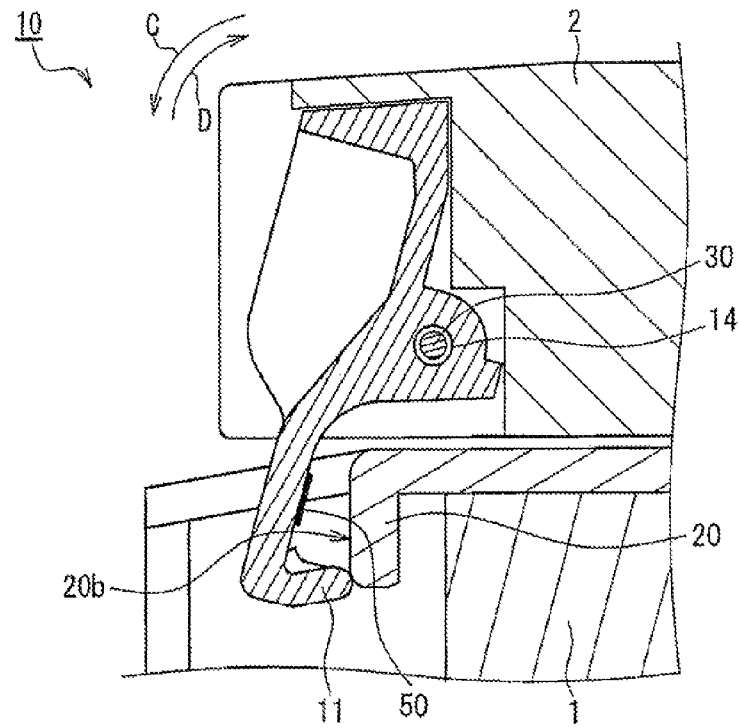
FIG. 12A is a cross-sectional view of Modified Example 3 of the notebook computer according to the present embodiment.
Figure 12B:
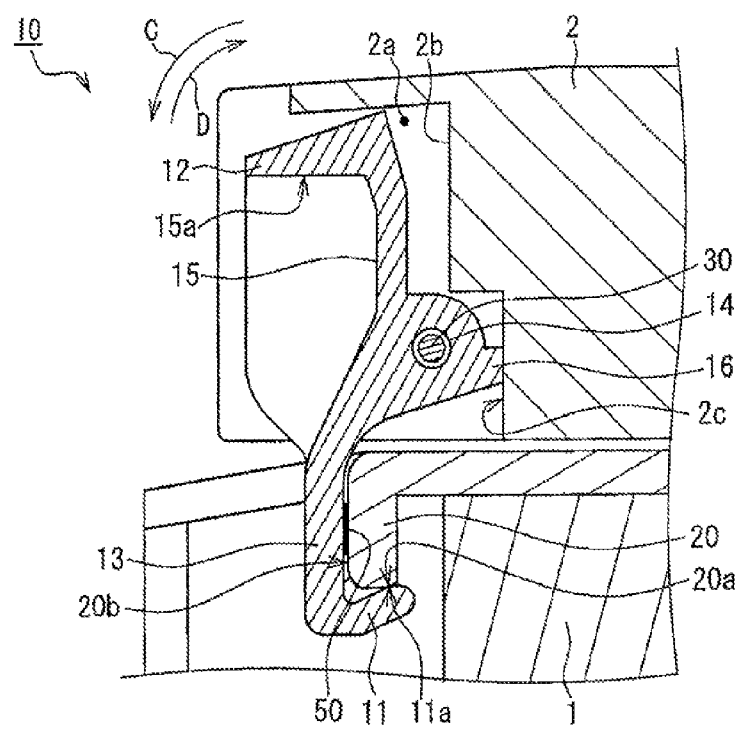
FIG. 12B is a cross-sectional view of Modified Example 3 of the notebook computer according to the present embodiment.

FIGS. 12A and 12B are cross-sectional views of the lock member 10 with the rib 50 and the vicinity thereof. FIG. 12A illustrates a state in which the engagement between the hook 11 and the engagement portion 20 is cancelled. FIG. 12B illustrates a state in which the hook 11 is engaged with the engagement portion 20. The lock member 10 illustrated in FIGS. 12A and 12B is provided with the rib 50 at the extension portion 13. The rib 50 is placed at the position where the rib 50 can come into contact with the side surface 20b of the engagement portion 20 when the hook 11 is engaged with the engagement portion 20 as illustrated in FIG. 12B. The rib 50 may be formed integrally with the lock member 10 or may be provided by fixing another member. It is preferred that the rib 50 is made of a material, such as resin, softer than that (magnesium in the present embodiment) of the lock member 10.

With such a configuration, when the lock member 10 is rotated from the state illustrated in FIG. 12A in the direction indicated by the arrow C with a biasing force of the coil spring (not shown) to be shifted to the state illustrated in FIG. 12B, the rib 50 comes into contact with the side surface 20b of the engagement portion 20. At this time, although the lock member 10 may rotate in the direction indicated by the arrow C with momentum due to the biasing force of the coil spring (not shown), since the contact area between the lock member 10 and the engagement portion 20 is small, a hammering sound generated at a time of the contact can be reduced.

Due to the presence of the rib 50 as illustrated in FIGS. 12A and 12B, the contact area between the lock member 10 and the engagement portion 20 can be reduced. Thus, damage and exposure of an underlying part, which are caused in the engagement portion 20 when the lock member 10 is brought into contact with the engagement portion 20 repeatedly, can be limited in a narrow range, which is preferred since the damage and exposure of an underlying part become inconspicuous.

The present application is useful for electronic equipment having an open/close lock mechanism.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. Electronic equipment, comprising:
    a first housing having a first surface defining a first principal plane;
    a second housing having a second surface defining a second principal plane, rotatably mounted to said first housing about an axis substantially parallel to the first and second principal planes, and rotatable from a first position in which the first surface and the second surface face each other to a second position in which the first surface and the second surface are exposed from each other; and
    a lock member rotatably mounted, about an axis substantially parallel to the axis of rotation between the first and second housings, to an exterior surface of the second housing at a position opposite to the position where the second housing is rotatably mounted to the first housing, the lock member comprising:

a hook configured to engage a surface of the first housing that faces away from the second housing when the first and second housings are in the first position, the lock member being rotatable from a third position in which the hook prevents movement of the first and second housings between the first and second positions and a fourth position in which the hook is disengaged from the first housing to permit movement of the first and second housings between the first and second positions; and a contact portion configured to be contacted by a user to rotate the lock member from the third position to the fourth position, wherein a direction of rotational movement by the second housing from the first position to the second position is the same as a direction of rotational movement by the lock member from the third position to the fourth position, the hook comprises an inner surface that contacts the surface of the first housing that faces away from the second housing in the third position, and the inner surface of the hook defines an angle in a range of 5 to 45 degrees with respect to a tangent at an intersection of the hook and a movement path of the hook when the lock member is rotated.

2. The electronic equipment of claim 1, wherein the lock member is urged toward the third position.

3. The electronic equipment of claim 1, wherein the first housing contains a circuit board and the second housing contains a display.

4. The electronic equipment of claim 3, which is in a form of a laptop computer.

5. The electronic equipment of claim 1, wherein the contact portion and the axis of rotation of the lock member are positioned on a first side relative to the second principal plane, and the hook is positioned on a second side relative to the second principal plane.

6. The electronic equipment of claim 5, wherein the first housing comprises an edge face, a portion of the lock member faces the edge face of the first housing in the first position, and a rib is provided on the portion of the lock member that faces the edge face of the first housing in the first position.

7. The electronic equipment of claim 6, wherein the lock member is made of metal and the rib is made of resin.

8. The electronic equipment of claim 1, wherein the hook comprises a protective member at a position capable of contacting the first housing when the second housing is rotated from the second position to the first position.

9. The electronic equipment of claim 1, wherein the second housing comprises an edge face defining a cavity, and the lock member is disposed in the cavity.

10. The electronic equipment of claim 1, wherein a gap is present between the first and second housings in the vicinity of the lock member when the first and second housings are in the first position and the lock member is in the third position, and the gap decreases during an initial movement of the lock member from the third position toward the fourth position.

11. The electronic equipment of claim 10, wherein, when the first and second housings are in the first position, the second housing is biased in the direction of the second position.

12. The electronic equipment of claim 1, wherein the inner surface of the hook defines an acute angle relative to a portion of the lock member from which the hook extends.

* * * * *